United States Patent [19]

Deerwester

[11] 4,194,268
[45] Mar. 25, 1980

[54] APPARATUS AND METHOD FOR SEPARATION OF SAUSAGE CHUBS

[75] Inventor: Donald A. Deerwester, Lowell, Ind.

[73] Assignee: George Pappageorge, Chicago, Ill.; a part interest

[21] Appl. No.: 946,817

[22] Filed: Sep. 28, 1978

[51] Int. Cl.² .............................................. A22C 11/00
[52] U.S. Cl. ....................................... 17/52; 17/1 F; 17/49
[58] Field of Search ................. 17/52, 1 F, 49, 12, 17/34; 83/694, 695, 697, 98

[56] References Cited

U.S. PATENT DOCUMENTS

| 597,408 | 1/1898 | Goldsmith | 17/12 |
|---|---|---|---|
| 1,389,784 | 9/1921 | Rece et al. | 17/12 |
| 2,313,525 | 3/1943 | Edelman | 83/98 |
| 2,417,890 | 3/1947 | Staufenbiel | 17/12 |
| 2,670,498 | 3/1954 | Mosby | 17/1 F |
| 2,672,646 | 3/1954 | Demarest et al. | 17/1 F |
| 3,799,022 | 3/1974 | Nagel et al. | 83/694 X |

Primary Examiner—Willie G. Abercrombie

[57] ABSTRACT

An apparatus and a method are provided in which a connecting portion between sausage chubs is positioned in an inner end of a slot in a guide structure and a blade unit is then moved within the guide structure to sever the connecting portion. In one embodiment, two spaced blades are provided which can cut between facing surfaces of adjacent chubs and the outer sides of clips on the ends of a connecting portion. The blades are pivotal and have beveled edges. A spacer between the blades has a projecting portion engaging the connecting portion to provide a tensioning action which facilitates cutting. In another embodiment, a single thin blade moves between a pair of thin plates of a guide structure for severing of a very short connecting portion between sausage chubs. The blades may be operated manually as by fluid-operated cylinders, solenoids or other actuating means.

17 Claims, 15 Drawing Figures

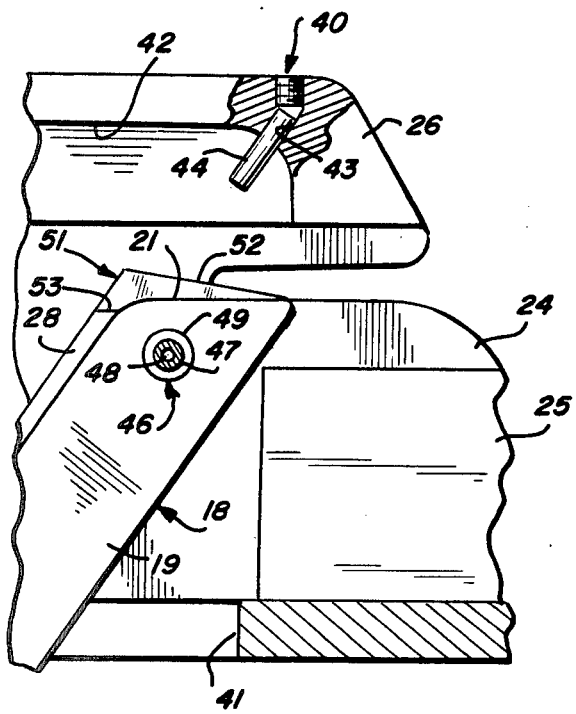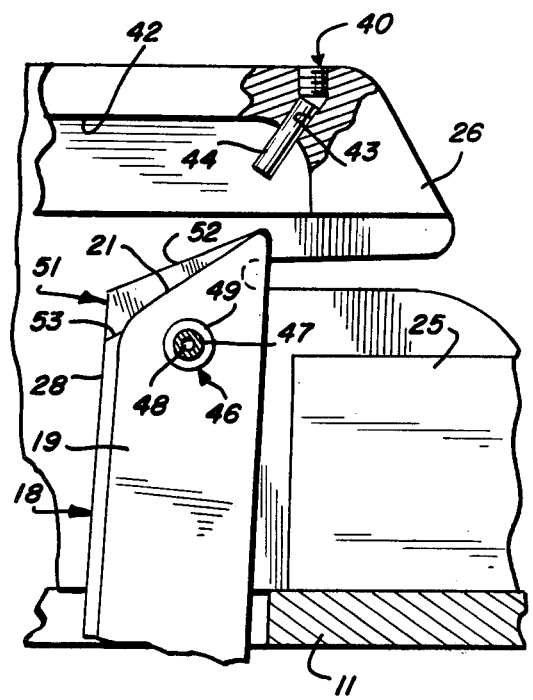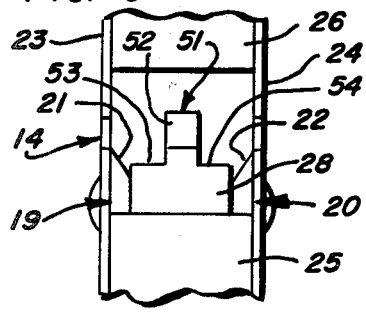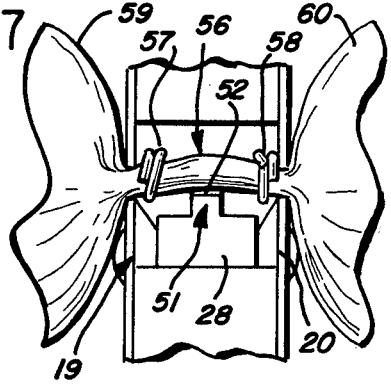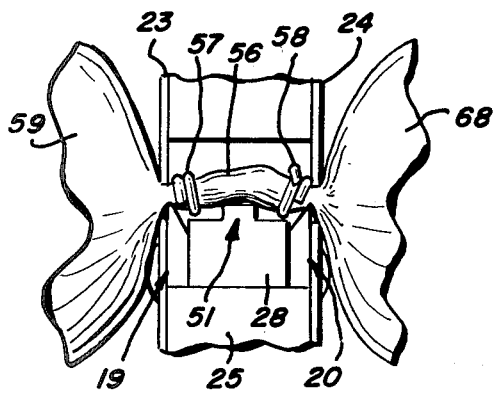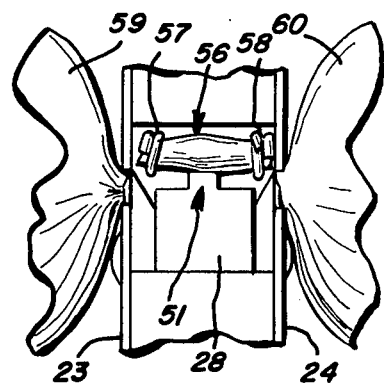

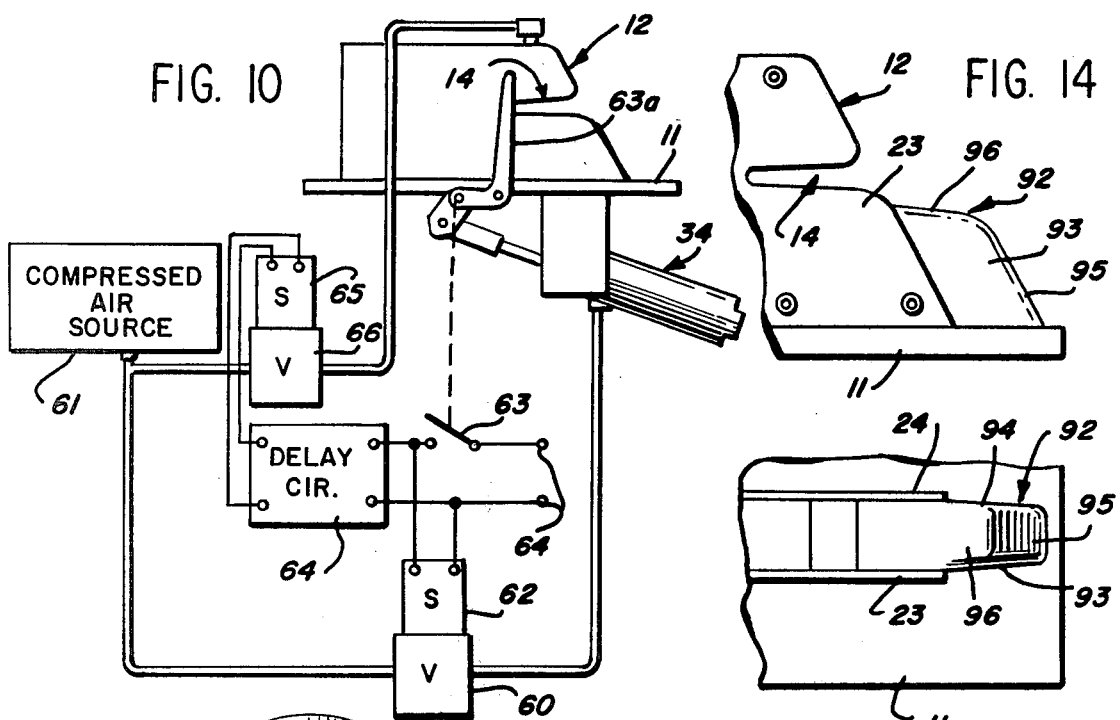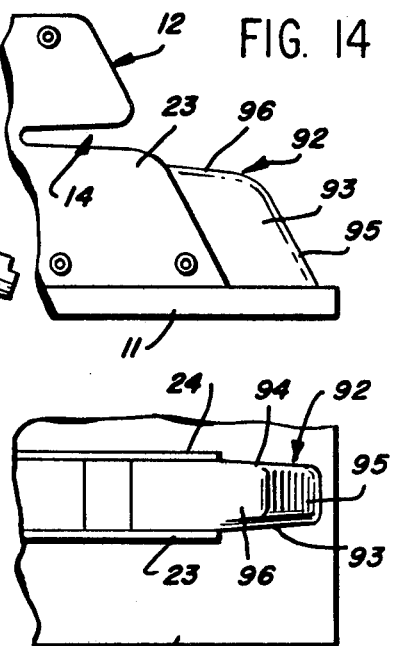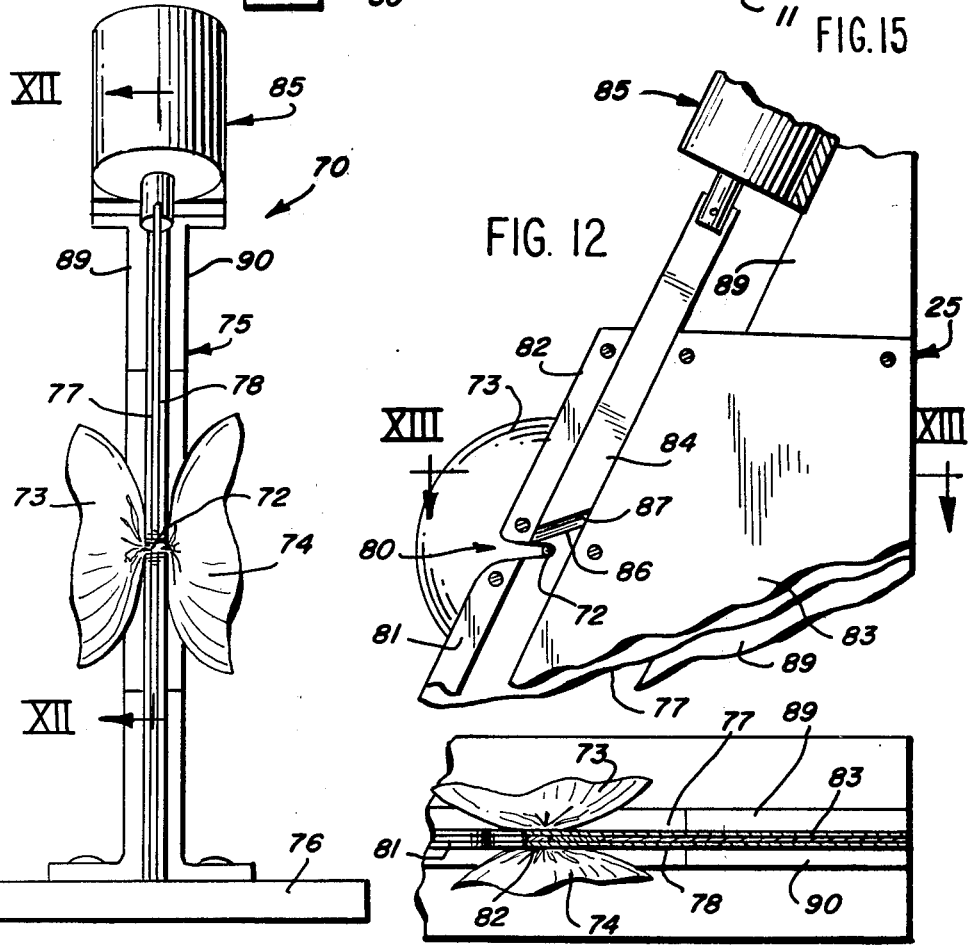

APPARATUS AND METHOD FOR SEPARATION OF SAUSAGE CHUBS

This invention relates to an apparatus and method for separation of sausage chubs and more particularly to an apparatus and method by which chubs are easily and quickly separated with a very high degree of accuracy and reliability. The apparatus and method are especially advantageous in facilitating the removal of casing closure clips of various types and thereby facilitating the subsequent performance of vacuum wrap operations. The apparatus is relatively simple in construction and operation and is highly reliable, rugged and durable, requiring minimum maintenance.

BACKGROUND OF THE PRIOR ART

Various types of apparatus have heretofore been proposed for separation of frankfurters or sausages which are linked together during manufacture but the proposed types of apparatus have had a number of disadvantages and they have been limited to certain types of operations. In typical prior proposed arrangements, means are provided for longitudinally advancing a chain of frankfurters or sausages and sensing means are provided for the purpose of detecting when the forward sausage reaches a certain position and for automatically activating means for severing the connection between that sausage and the sausage therebehind. In such arrangements, the sensing means usually comprises either a feeler element or photocell means and when the frankfurters or sausages are not uniform dimensionally or in consistency, it is difficult to obtain a high degree of accuracy with respect to the position of the cut.

In another proposed arrangement, as disclosed in the Gosling et al U.S. Pat. No. 4,060,875, sensing means as such are not used and a forked blade is provided on a reciprocable carriage, the blade being designed to enter between sausage links and to advance connection between a lead link and a link therebehind to a cutting zone. This arrangement might operate satisfactorily under appropriate conditions but with variations in the dimensions and consistency of the sausages, it would be difficult to reliably obtain accurate positioning and feeding.

Difficulties are also experienced with respect to the operation of the prior art severing means which typically comprise a blade having a knife edge which is moved through a path intersecting the anticipated position of a connecting portion between adjacent sausages. The blade may be reciprocable as disclosed in the Gouba U.S. Pat. Nos. 3,156,006 and 3,808,636 and also the Gosling U.S. Pat. No. 4,060,875. In the alternative, the blade may be pivotal or rotatable as disclosed in the Piereder U.S. Pat. No. 3,545,035, the Berendt et al U.S. Pat. Nos. 3,646,637 and 3,659,316, the Demarest U.S. Pat. No. 3,716,891 and the Berg U.S. Pat. No. 3,840,937.

In such prior art arrangements, the blades must generally be moved at a relatively high speed to obtain satisfactory cutting and when the sausage connecting portion to be severed is relatively tough, it may not be possible to reliably obtain satisfactory operation. The Mueller U.S. Pat. No. 4,073,039 discloses an arrangement which includes two blades operative in a scissor-like fashion, which has certain advantages but which requires a degree of accuracy in the positioning which is difficult to obtain when the dimensions of the sausages vary to a substantial extent. The arrangement is also complicated and the same is true of the various other prior art arrangements which because of their complicated mechanisms are prone to mal-functions and breakdowns as well as being very expensive to construct. There is also a problem in adjustment to accommodate various types of sausages and sizes of sausages.

An additional disadvantage of the various types of apparatus as heretofore proposed is that they are not usable for separating certain forms of sausages and, as a result, such forms of sausages have been separated by hand using conventional knives. For example, a common type of sausage form is one in which sausages or filled casing portions, referred to as "chubs", are interconnected by an unfilled connecting casing portion which is bound or tied at its opposite ends by a pair of metal clips with the outer ends of the clips being disposed against facing end surfaces of adjacent chubs. It is necessary that the clips be removed, especially when the chubs are to be packaged for marketing through a vacuum sealing operation. If not removed, sharp edges may result to cut through the sealing plastic and destroy the seal. The removal of the clips by hand is, of course, a difficult, time-consuming and expensive operation.

In other forms of sausages such as Polish sausages, clips may not be used but the sausages may be connected by very short twisted casing portions with the adjacent end surfaces of sausages being very close together. The automatic machines of the prior art do not have the accuracy necessary to perform a reliable separating operation in connection with such sausages.

SUMMARY OF THE INVENTION

This invention was evolved with the general object of overcoming disadvantages of the prior art and of providing an apparatus and method for rapid separation of sausages with a high degree of accuracy and reliability.

Another object of the invention is to provide apparatus which operates with a very high degree of accuracy, permitting separation of sausages wherein very short connecting portions and also permitting separation of tying clips from sausages.

A further object of the invention is to provide apparatus which is relatively simple in construction and operation and which is rugged and reliable, with minimum maintenance being required.

In accordance with this invention, a guide means is provided which is arranged to be inserted between a pair of chubs and into engagement with adjacent end surfaces of the chubs and blade means are provided, disposed within the guide means between spaced portions thereof, the blade means being moved within the guide means in a cutting direction to sever the connecting portion between the sausage chubs. With this comparatively simple arrangement, the severing of the connecting portion is insured since the blade means is disposed within the guide means and since the guide means is inserted between the end surfaces of the chubs prior to the cutting operation. The arrangement does not rely upon the use of means to sense the position of the connecting portion and does not rely upon any timing operation.

A very important feature relates to the accuracy which can be obtained. In the separation of chubs having an approximately uniform spacing distance between facing end surfaces thereof, the guide means has a thickness at least equal to the uniform spacing distance between chubs so as to engage such facing end surfaces and accurately position the blade means. In apparatus for separation of sausages in which there is a very short distance between the end surfaces of adjacent sausages, the guide means may be in the form of thin plates with a thin blade sandwiched therebetween. In apparatus in which the sausage chubs are separated by a casing portion having clips on its opposite ends, accurate cutting in relation to the clips is made possible and further very important features relate to a double bladed arrangement for simultaneously cutting between the end surfaces of chubs and the outer sides of a pair of tying clips.

In connection with the two blade construction, an important feature is in the provision of tensioning means disposed between the blades and arranged for moving in the cutting direction to engage the sausage connecting portion at a central point during movement of the blade means and to apply tension to facilitate cutting by the blades. The tensioning arrangement is also important in that it pulls the clips away from the blades to avoid contact therebetween and thereby avoid damage to cutting edges of the blades.

According to another specific feature, the guide means includes a pair of spaced stop portions for engaging spaced points on at least one side of the connecting portion opposite the side thereof initially engaged by the blade means during cutting movement. This feature further facilitates the cutting operation. Preferably, the guide means has a slot extending inwardly from an edge surface thereof and arranged for receiving the connecting portion with the spaced stop portions being defined by inner surface portions of the slot. The slot facilitates accurate positioning of the connecting portion for cutting and is preferably convergent from a wider outer entrance and to a narrowed inner terminal end so as to facilitate entry of the connecting portion as well as to provide accurate positioning.

Further features of the invention include arrangements such that an operator can quickly position the connecting portion between chubs in a fixed guide means and then cause operation of the cutting blade, as through a knee or foot controlled switch. The arrangements, while requiring a manual feed operation, are such that the sausage chubs can be severed at a very high rate of speed, comparable to or even exceeding speeds which might be obtained through an attempted automatic feed and avoiding the problems associated with automatic feeding operations. It should be understood, of course, that, if desired, automatic feed operations might be used in conjunction with apparatus embodying the concepts of the invention.

This invention contemplates other objects, features and advantages which will become more fully apparent from the following detailed description taken in conjunction with the accompanying drawings.

BRIEF DESCRIPTION OF THE DRAWINGS

FIG. 4 is a sectional view of a portion of the apparatus, taken substantially along lines IV—IV of FIG. 2 and showing a blade unit and its cooperation with a guide structure, FIG. 4 being on an enlarged scale;

FIG. 5 is a view similar to FIG. 4 but illustrating a blade unit at the end of its travel in a cutting direction, the blade unit being shown in FIG. 4 prior to its movement in a cutting direction;

FIG. 6 is an end elevational view of the upper cutting portion of the blade unit and the associated portion of the guide structure, on the same enlarged scale as FIGS. 4 and 5 and showing the blade unit in its initial position;

FIG. 7 is a view similar to FIG. 6, showing a connecting portion between two chubs disposed in the guide structure and in a position prior to cutting operation;

FIG. 8 is a view similar to FIG. 7 but illustrating the conditions after the blade unit has travelled a cetain distance in a cutting direction;

FIG. 9 is another view similar to FIGS. 7 and 8, illustrating the conditions when the blade unit has traveled still further in the cutting direction, FIGS. 7, 8 and 9 together illustrating how the cutting operation is effected;

FIG. 10 is a diagram illustrating electrical and pneumatic control and activating means for the apparatus;

FIG. 11 is a front elevational view of another preferred embodiment of apparatus constructed in accordance with the invention, the apparatus having a single cutting blade;

FIG. 12 is a sectional view taken substantially along line XII—XII of FIG. 11;

FIG. 13 is a sectional view taken substantially along line XIII—XIII of FIG. 12;

FIG. 14 is an elevational view of a forward portion of an apparatus like that of FIGS. 1-10 but having a modified spacer block member; and FIG. 15 is a top plan view of the structure shown in FIG. 14.

DESCRIPTION OF A FIRST PREFERRED EMBODIMENT

Figure 1:
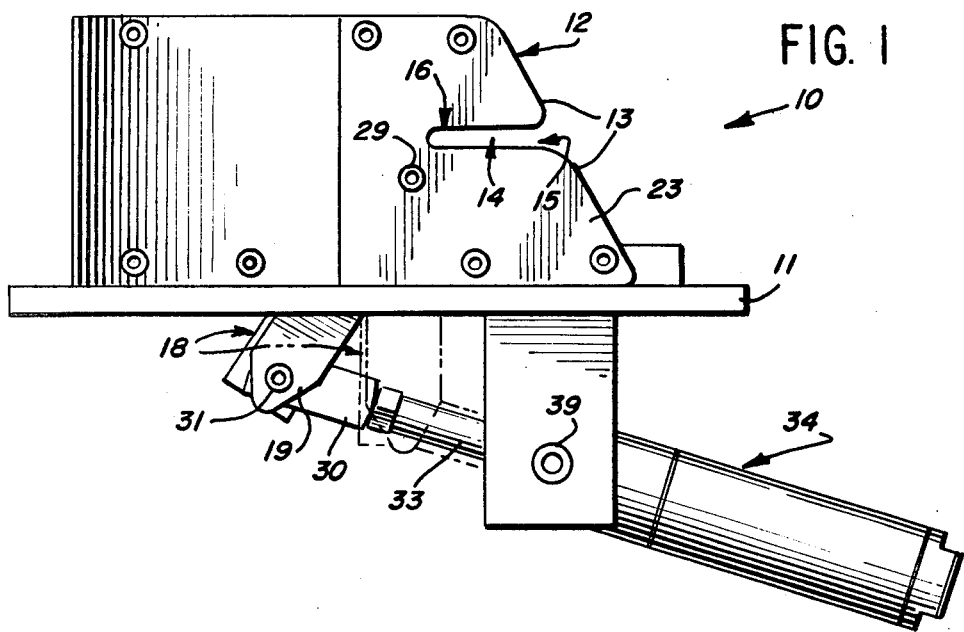
FIG. 1 is a side elevational view of apparatus constructed in accordance with the invention, having two blades and designed for removal of chub-connecting portions having a pair of tying clips secured thereto.
Figure 2:
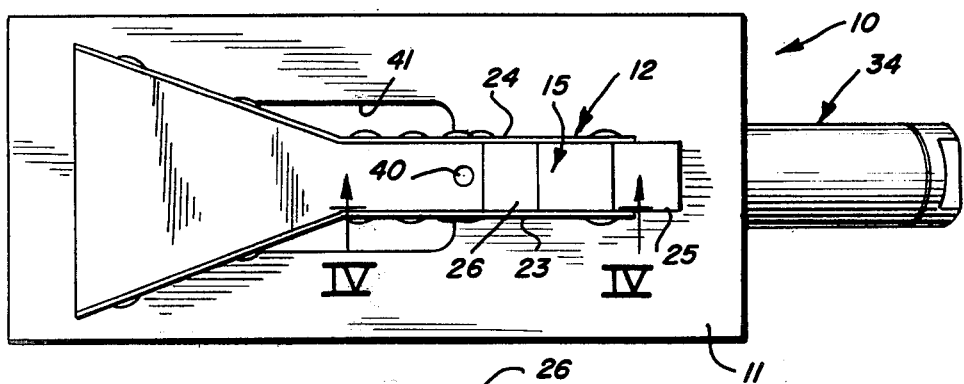
FIG. 2 is a top plan view of the apparatus of FIG. 1.
Figure 3:
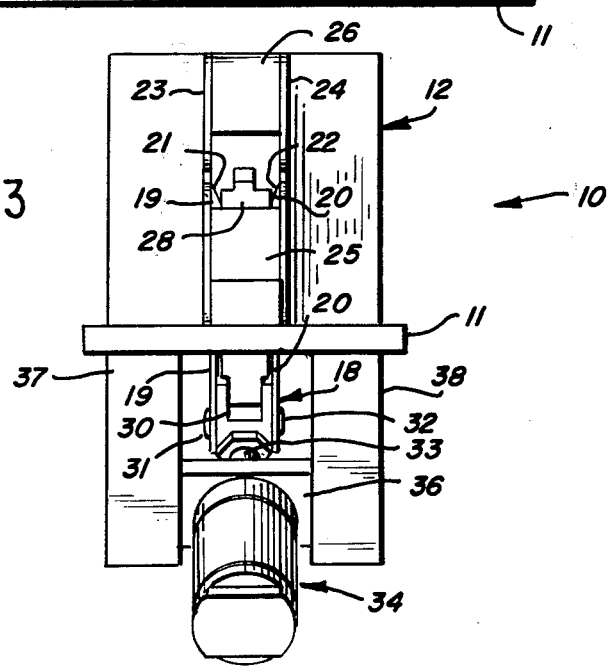
FIG. 3 is an end elevational view of the apparatus of FIG. 1.

Referring to FIGS. 1-3, reference numeral 10 generally designates apparatus constructed in accordance with the principles of this invention and specifically designed for use in separating sausage chubs interconnected by connecting portions to which a pair of tying clips are secured. In one type of sausage manufacturing operation, a metal clip is secured around one end of a sausage casing and a portion of the casing is filled to form a sausage chub, the opposite end of the portion being closed by a second clip. Then a third clip is tied around the casing, spaced a short distance from the second clip and then another portion of the casing is filled, closed at its opposite end by a fourth clip. This operation is continued to form a chain of sausage chubs with interconnections therebetween formed by unfilled connecting casing portions, with each such connecting portion being bound at its opposite ends by a pair of tying clips. The apparatus 10 is specifically designed for the removal of such connecting portions together with the clips thereon.

The apparatus 10 includes a base plate 11 which may be mounted on the upper surface of a table top having an opening for receiving structure which depends from the base plate 11. A guide structure 12 is mounted on the upper surface of the base plate 11 and has a rearwardly inclined forward edge surface 13 and a slot 14 extending rearwardly from the surface 13.

In operation, the operator stands behind the apparatus, i.e. to the left as viewed in FIGS. 1 and 2, and grasps two adjacent chubs and pulls them rearwardly on opposite sides of the guide structure 12 engaging a connecting portion between such chubs into the slot 14. It is noted that the slot 14 is convergent from a wider outer and forward entrance end 15 at the edge surface 13 to a narrowed inner terminal end 16, facilitating entry of the connecting portion and accurate positioning for cutting, when the connecting portion reaches the inner and rearward terminal end 16.

For cutting, a blade unit 18 is provided which is mounted within the guide structure 12 and which includes a pair of blades 19 and 20 having knife edges 21 and 22 at the upper ends thereof. The blades 19 and 20 have planar surfaces disposed against inner facing surfaces of portions of a pair of plates 23 and 24 of the guide structure 12, a spacer block 25 being disposed between lower portions of the plates 23 and 24 and another spacer block 26 being disposed between upper portions of the plates 23 and 24. The blades 19 and 20 are on opposite sides of a spacer member 28 to form the blade unit 18 which is supported for pivotal movement about a horizontal axis which extends through a screw 29, to the rear and below the inner rearward terminal end 16 of the slot 14.

The blade unit 18 is illustrated in FIG. 1 in an initial position in which the knife edges 21 and 22 of the blades 19 and 20 are just below the lower edges of aligned slots in the plates 23 and 24 which define the slot 14. When the blade unit 18 is pivoted in a clockwise direction as viewed in FIG. 1, to a position as indicated in broken lines in FIG. 1, the knife edges 21 and 22 move upwardly through the rearward terminal end 16 of the slot 14 to sever the connecting casing portion between a pair of chubs. The specifics of the cutting operation are set forth in more detail in the description of the operation in connection with FIGS. 4–9.

To operate the blade unit 18, the lower end thereof is pivotally connected to a coupling member 30 through a pin to which a pair of mounting screws 31 and 32 are secured. The coupling member 30 is secured to the end of a piston rod 33 which is actuated by a piston within an air cylinder 34. Cylinder 34 is carried by a trunnion member 36 which is journalled between a pair of supports 37 and 38 by journalling means held in place by a screw 39. The members 37 and 38 are secured to the lower side of the base plate 11.

After a connecting portion together with clips thereon is severed through the operation of the blade unit 18, it is directed rearwardly through a jet of compressed air which is supplied through an opening 40 in the spacer block 26. The connecting portion may then fall downwardly through an opening 41 in the base plate 11, a forward part of which is seen in FIG. 2, and through an opening in the table top on which the base plate 11 is mounted. Preferably, the side plates 23 and 24 are flared outwardly at the rearward ends thereof, to provide additional space for ejection of the severed connecting portions and clips.

As shown in FIG. 4, the upper spacer block 26 of the guide structure 12 has a recess 42 in its lower surface for providing additional space for movement of severed connecting portions and clips. As also indicated, the opening 40 is internally threaded for receiving a suitable compressed air fitting and it extends to a bore 43 in which a tube 44 is disposed, the tube 44 being angled downwardly and rearwardly and being so positioned as to apply an air jet to a severed connecting portion to facilitate rearward movement thereof.

FIG. 4 also illustrates part of a pin 46 which journals the blade unit 18 for its pivotal movement, the pin 46 having a reduced diameter end portion 47 which extends through an opening in the side plate 23 with the screw 29 being threaded into an opening 48 in the pin 46. The pin 46 also includes a shoulder 49 which is engaged with the inner surface of the side plate 23 and further includes a shoulder engaged with the inner side of the blade 19, the pin 46 having a larger diameter portion disposed in an opening in the spacer member 28. The pin 46 is also formed with similar shoulders for cooperation with the other plate 24 and the other blade 20 and it aids in accurately positioning the blades relative to each other and to the plates 23 and 24.

The blades 19 and 20 are beveled at their upper ends to form the knife edges 21 and 22, as shown in FIG. 6, for example. The use of sharpened knife edges is desirable for cutting of typical sausage casing materials which tend to be quite tough and not such as to be readily severed through a shearing operation. It is however desirable that the sharpened edges of the blades move along the inner planar surfaces of the plates 23 and 24 of the guide structure 12 and another important feature is that the upper downwardly facing surfaces of the slots in the plates, forming the slot 14, provide stop surface portions against which spaced points on the upper surface of a connecting portion are engaged. With this feature, the connecting portion is severed through what may be described as a combination of shearing and cutting forces applied thereto.

An important specific feature of the invention relates to the construction of the blade spacer member 28 in a manner such as to tension the connecting portion to be severed and to further facilitate an accurate and reliable cutting operation. As shown, the blade spacer member 28 has an upstanding portion 51 on its upper end with an upper surface 52 of the portion 51 being upwardly and rearwardly inclined in relation to the knife edges 21 and 22 when such are in an initial horizontal condition as depicted in FIG. 4, for example. The blade spacer member 28 further includes upper surface portions 53 and 54 on opposite sides of the upstanding portion 51, such surfaces being below the upper edges of the blades in the initial position of the blade unit 18.

FIG. 7 shows the relationship of the apparatus to a connecting portion 56, a pair of clips 57 and 58 and a pair of chubs 59 and 60 just prior to the initiation of operation of the blade unit 18. It is noted that when the operator pulls the chubs 59 and 60 rearwardly to position the connection portion 56 in the rearward terminal end 16 of the slot 14, the central part of the connecting portion 56 engages the rearwardly and upwardly inclined surface 52 of the upstanding part 51 of the blade spacer member 28 to apply a certain degree of tension to the connecting portion 56, especially along the lower edge thereof which is to be engaged by the knife edges 21 and 22. When the blade unit 14 is operated to move the knife edges 21 and 22 upwardly, as illustrated in FIG. 8, the connecting portion 56 is further moved upwardly to increase the tensioning thereof and to also move the clips 57 and 58 away from the knife edges. It is noted that because the surfaces 53 and 54 are located below the knife edges, additional space is provided for the clips 57 and 58.

When the knife edges move just beyond the upper edges of the slots in the guide plates 23 and 24 which define the slot 14, the clips 57 and 58 together with the connecting portion 56 are completely severed and are moved upwardly as illustrated in FIG. 9. At this point, a compressed air jet, applied through the tube 44, moves the connecting portion and the clips attached thereto to the rear so that they can fall through an opening in the rearward end of the unit into a chute disposal basket or the like.

As diagrammatically illustrated in FIG. 10, the cylinder 34 may be coupled through a valve 60 to a compressed air source 61, the valve 60 being operated by solenoid 62 which is coupled through a switch 63 to voltage supply terminals 64. Switch 63 may be operated from a lever 63a in a position to be engaged by a chub pulled into the device and properly positioned for the severing operation. Switch 63 may alternatively be operated by the knee or foot of the operator. When the switch 63 is opened, the piston within the cylinder 34 may be moved back to its initial condition through spring means within the cylinder 34. Alternatively, or in addition, the valve arrangement may be such as to apply compressed air to assist the retracting movement.

As also illustrated diagrammatically in FIG. 10, closure of the switch 63 may apply a signal through a delay circuit 64 to a solenoid 65 to operate a valve 66 and to apply an air jet through the tube 44 in the manner as above described. Other types of actuating and control arrangements may be used. For example, instead of using solenoid operated valves, a type of valve may be used which is mechanically operated or tripped by a lever which is positioned like the lever 63a, and the same valve may be used to supply compressed air to the tube 44.

DESCRIPTION OF A SECOND PEFERRED EMBODIMENT

Referring to FIGS. 11-13, reference numeral 70 generally designates another form of apparatus constructed in accordance with the principles of this invention and shown in use in separating very short connecting portion 72 between a pair of chubs 73 and 74. The chubs 73 and 74 may be Polish sausages, for example, and the connecting portion 72 may be a short twisted casing portion.

The apparatus 70 includes a guide structure 75 on a base 76 which may be secured to a table top and the guide structure includes a pair of thin plates 77 and 78 having aligned slots defining a slot 80 for receiving the connecting portion 72 as illustrated. The plates 77 and 78 are held in spaced relation by forward spacer members 81 and 82 below and above the forward end of the slot 80 and by a rearward spacer member 83 behind the rearward terminal end of the slot 80. The forward edges of the spacer members 81 and 82 and aligned forward edge portions of the plates 77 and 78 may preferably be rearwardly inclined as illustrated, forming an edge surface from which the slot 80 extends rearwardly. The slot 80 may preferably be so formed as to converge from a wider forward entrance end to a narrowed inner terminal end as illustrated, facilitating entry of the connecting portion 72 and the accurate positioning thereof.

The spacer members 81, 82 and 83 together with the plates 77 and 78 form an internal passage which receives a single knife blade 84 which is connected at its upper end to a solenoid 85 on the upper end of the guide structure 75. The knife blade 84 includes a lower knife edge 86 which is inclined upwardly and rearwardly and which is formed through the intersection of a beveled surface 87 and a planar surface of the blade 84 which is disposed against the plate 77. When the solenoid 85 is energized, the blade 84 is moved downwardly to sever the connecting portion 72. The assembly of the plates 77 and 78 with the spacer members 81-83 therebetween is preferably held between a pair of heavier plates 89 and 90 which also serve to support the solenoid 85 from the base plate 76.

It is noted that with the construction as illustrated in FIGS. 11-13, the guide means formed by plates 77 and 78 and parts therebetween can be quite thin so as to readily enter between closely adjacent end surfaces of a pair of chubs and to provide accurate positioning of the connecting portion 72 for severance thereof.

FIGS. 14 and 15 illustrate a modification of the apparatus 10 which is advantageous with certain types of clips. A modified spacer block 92 is substituted for the lower spacer black 25. Block 92 extends forwardly a substantial distance and has side surfaces 93 and 94 which converge to a narrowed forward end 95. The block 92 may also have a downwardly inclined upper surface 96. The side surfaces 93 and 94 engage the end surfaces of adjacent chubs and, when the chubs are pulled rearwardly, they apply separating forces to tension the connecting portion between chubs and surfaces 93 and 94 also facilitate entry of clips between the side plates 23 and 24 in an accurate manner. A similar type of block or spacer member may be used in place of the upper spacer block 26 and one or a pair of similar types of blocks or spacer members may be used in the apparatus 70 of FIGS. 11-13.

With both types of apparatus as illustrated, the chubs can be separated at a very high rate of speed even with manual feed of the chubs thereto. It should be noted, however, that the principles of the invention can be applied in apparatus having automatic feed means if an extremely high production rate is required. It is also noted that the apparatus 10 can be used with clips which are of metal and of types different from that illustrated, with clips which are in the form of a cord or of a plastic material or with sausage types in which no clips at all are used.

It will be understood that other modifications and variations may be effected without departing from the spirit and scope of the novel concepts of this invention.

I claim as my invention:

1. Apparatus for separation of sausage chubs which are interconnected by thin connecting portions, comprising: guide means arranged for extending between facing end surfaces of a pair of adjacent chubs and for receiving the associated connecting portion, and blade means supported for movement within said guide means and movable in a cutting direction within said guide means to sever the said associated connecting portion.

2. In apparatus as defined in claim 1 for separation of chubs wherein there is an approximately uniform spacing distance between facing end surfaces of a pair of chubs, said guide means having a thickness at least equal to said uniform spacing distance to provide opposed surfaces for engagement with the facing end surfaces of a pair of adjacent chubs to accurately position said blade means in relation to the said associated connecting portion.

3. In apparatus as defined in claim 1, said blade means comprising a single blade for severing the said associated connecting portion at a point between its end.

4. In apparatus as defined in claim 1, said blade means comprising a pair of blades arranged in spaced relation for severing the ends of the said connecting portion from said pair of chubs.

5. In apparatus as defined in claim 4, wherein a pair of clips are provided around end portions of each connecting portion adjacent end surfaces of the associated pair of chubs, the spacing of said blades being such as to sever the ends of the connecting portion at the end surfaces of the chubs and on the outer sides of the pair of clips to remove the clips together with the connecting portions from the chubs.

6. In apparatus as defined in claim 4, tensioning means disposed between said pair of blades and arranged for moving in said cutting direction and engaging the said connecting portion at a central point during movement of said blade means in said cutting direction and for applying tension to said connecting portion to facilitate cutting by said blades.

7. In apparatus as defined in claim 6, said tensioning means being carried by said blade means.

8. In apparatus as defined in claim 1, said guide means including a pair of spaced stop portions for engaging spaced points on at least one side of the said connecting portion which is opposite the side initially engaged by said blade means during movement in said cutting direction.

9. In apparatus as defined in claim 8, said blade means comprising a pair of spaced blades for engaging and cutting the said connecting portion at spaced points approximately aligned with said spaced points engaged by said stop portions of said guide means.

10. In apparatus as defined in claim 8, said guide means having a slot extending inwardly from an edge surface thereof and arranged for receiving the said connecting portion with spaced stop portions being defined by inner surface portions of said slot.

11. In apparatus as defined in claim 10, said slot being convergent from a wider outer entrance end at said edge surface to a narrowed inner terminal end to facilitate entry of the said connecting portion and accurate positioning thereof for cutting.

12. In apparatus as defined in claim 1, said blade means including a blade having a sharpened knife edge for cutting engagement with the said connecting portion.

13. In apparatus as defined in claim 12, said blade means including at least a first stop surface portion for engagement with one side of the said connecting portion and at least a first planar surface portion extending to a corner at said stop surface portion, and said blade having a planar surface portion for alignment with said first planar surface portion of said guide means during cutting movement and a beveled edge portion extending to said planar surface portion to define said sharpened knife edge.

14. In apparatus as defined in claim 13, said guide means including a second stop surface portion in spaced relation to said first stop surface portion for engagement with said one side of the said associated connecting portion and a second planar surface portion extending to a corner at said second stop surface portion and in spaced facing relation to said first planar surface portion, and said blade means comprising a second blade having a planar surface portion for alignment with said second planar surface portion of said guide means during cutting movement and having a beveled edge portion extending to said planar surface thereof to define a second sharpened knife edge.

15. In a method of separating sausage chubs which are interconnected by thin connecting portions, the steps of providing blade means, providing guide means including spaced portions receiving the blade means therebetween, moving the guide means between a pair of chubs and into engagement with end surfaces thereof, and moving the blade means in a cutting direction within the guide means to sever the connecting portion.

16. In a method as defined in claim 15, the further step of engaging a pair of spaced points on one side of the connecting portion which is opposite the side thereof engaged by the blade means and moving in the cutting direction.

17. In a method as defined in claim 16, applied in separating chubs interconnected by connecting portions each of which has a pair of clips around end portions thereof adjacent facing end surfaces of the chubs, the steps of providing a pair of blades in the blade means, and inserting the spaced portions of the guide means between the end surfaces of the chubs and the outer sides of the clips, and moving the pair of blades between the outer sides of the clips and the inner sides of the spaced portions of the guide means to remove the clips from the chubs and simultaneously remove the connecting portion with the clips.

* * * * *